US010889463B2

(12) United States Patent
Chapman et al.

(10) Patent No.: US 10,889,463 B2
(45) Date of Patent: Jan. 12, 2021

(54) METHOD AND SYSTEM FOR INDOOR WAYFINDING BASED ON ELEVATOR INFORMATION

(71) Applicant: Otis Elevator Company, Farmington, CT (US)

(72) Inventors: Ashley Chapman, Plainville, CT (US); Bradley Armand Scoville, Farmington, CT (US); Eric C. Peterson, East Longmeadow, MA (US); Paul A. Simcik, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 581 days.

(21) Appl. No.: 15/532,403

(22) PCT Filed: Dec. 2, 2015

(86) PCT No.: PCT/US2015/063308
§ 371 (c)(1),
(2) Date: Jun. 1, 2017

(87) PCT Pub. No.: WO2016/089932
PCT Pub. Date: Jun. 9, 2016

(65) Prior Publication Data
US 2017/0369278 A1 Dec. 28, 2017

Related U.S. Application Data

(60) Provisional application No. 62/086,482, filed on Dec. 2, 2014.

(51) Int. Cl.
B66B 3/00 (2006.01)
G01C 21/20 (2006.01)
G06F 3/0481 (2013.01)

(52) U.S. Cl.
CPC ............ B66B 3/006 (2013.01); G01C 21/206 (2013.01); G06F 3/04812 (2013.01)

(58) Field of Classification Search
CPC .. G05B 2219/31007; G05B 2219/2659; G05B 2219/40477; G01S 5/10;
(Continued)

(56) References Cited

U.S. PATENT DOCUMENTS 6,397,976 B1 * 6/2002 Hale ..................... B66B 1/2408
187/392
6,615,175 B1 9/2003 Gazdzinski
(Continued)

FOREIGN PATENT DOCUMENTS

EP 2704105 A1 3/2014
JP 2002128406 A 5/2002
WO 2014085900 A1 6/2014

OTHER PUBLICATIONS

Chinese Office Action for Chinese Application No. 201580065904.5 dated Sep. 28, 2018; 14 Pages.
(Continued)

Primary Examiner — Marlon T Fletcher
(74) Attorney, Agent, or Firm — Cantor Colburn LLP

(57) ABSTRACT

A system and method that processes a destination to derive a target floor based on receiving an elevator call that indicates a source floor and the destination. Further the system and method causes an elevator to travel between the source floor and the target floor in response processing the destination and performs at least one of a plurality of wayfinding operations upon arrival of the elevator at the target floor.

11 Claims, 4 Drawing Sheets

(58) Field of Classification Search
CPC .......... G01S 5/0226; G01S 1/00; G01S 1/042;
G01S 1/0428; G06F 16/954; H04N
2201/3253; B66F 9/063; B66F 9/0755;
B66B 3/006; B66B 1/468; B66B 3/002;
B66B 1/3492; B66B 1/52
See application file for complete search history.

(56) References Cited

U.S. PATENT DOCUMENTS

| | | | |
|---|---|---|---|
| 7,620,493 B2 | 11/2009 | Stankiewica et al. | |
| 8,744,754 B2* | 6/2014 | Kappeler | B66B 1/468 |
| | | | 701/410 |
| 2006/0100782 A1 | 5/2006 | Levi et al. | |
| 2006/0247849 A1 | 11/2006 | Mohsini et al. | |
| 2009/0043504 A1 | 2/2009 | Bandyopadhyay et al. | |
| 2009/0057068 A1* | 3/2009 | Lin | B66B 1/468 |
| | | | 187/392 |
| 2009/0216438 A1 | 8/2009 | Shafer | |
| 2011/0106449 A1 | 5/2011 | Chowdhary et al. | |
| 2011/0137549 A1 | 6/2011 | Gupta et al. | |
| 2012/0118677 A1* | 5/2012 | Finschi | B66B 1/2466 |
| | | | 187/384 |
| 2012/0130762 A1 | 5/2012 | Gale et al. | |
| 2012/0290253 A1 | 11/2012 | Barrett et al. | |
| 2013/0047120 A1 | 2/2013 | Albright | |
| 2013/0099968 A1 | 4/2013 | Katz | |
| 2013/0133421 A1 | 5/2013 | Katz | |
| 2013/0138342 A1 | 5/2013 | Zaid et al. | |
| 2016/0122157 A1* | 5/2016 | Keser | B66B 1/468 |
| | | | 187/388 |
| 2016/0325962 A1* | 11/2016 | Blandin | B66B 1/468 |
| 2016/0376124 A1* | 12/2016 | Bunter | B66B 1/468 |
| | | | 187/247 |
| 2017/0336210 A1* | 11/2017 | Rahman | H04W 4/33 |
| 2017/0349402 A1* | 12/2017 | Chapman | B66B 1/468 |
| 2017/0369278 A1* | 12/2017 | Chapman | B66B 3/006 |
| 2018/0299843 A1* | 10/2018 | Ray | H04L 41/0886 |
| 2019/0141663 A1* | 5/2019 | Swart | G01S 11/06 |
| 2020/0002124 A1* | 1/2020 | Wirola | G01C 21/206 |

OTHER PUBLICATIONS

Gillieron et al., "Indoor Navigation Performance Analysis", ENC GNSS, 2004, pp. 1-9.
International Search Report and Written Opinion for PCT Application No. PCT/US2015/063308, dated Mar. 2, 2016, pp. 1-10.

* cited by examiner

METHOD AND SYSTEM FOR INDOOR WAYFINDING BASED ON ELEVATOR INFORMATION

CROSS REFERENCE TO RELATED APPLICATIONS

This is a US National Stage of Application No. PCT/US2015/063308 filed on Dec. 2, 2015, which claims the benefit of priority to U.S. Provisional Application No. 62/086,482 filed Dec. 2, 2014, the disclosures of which are incorporated herein by reference in their entirety.

BACKGROUND

The disclosure relates generally to an intelligent building system for implementing enhanced indoor wayfinding based on elevator information. More specifically, the disclosure relates to an intelligent building system that translates and transmits elevator position information to enable enhanced wayfinding (i.e., enhanced indoor navigation) of that building's interior on a user device within a building.

Existing building infrastructure require users to read physical signs to find their destination within a building, and such infrastructures do not arrange service for the user outside these physically presented signs. One problem restricting such systems is that location technologies, such as global positioning systems (GPS) and the like, are unreliable indoors. Systems that identify a user's location with respect to elevator position information and arrange wayfinding service for the user in advance would be well-received in the art.

SUMMARY

According to one embodiment of the present invention, a method comprises receiving, by a processor, an elevator call that indicates a source floor and a destination; processing, by the processor, the destination to derive a target floor; causing, by the processor, an elevator to travel between the source floor and the target floor; and performing, by the processor, at least one of a plurality of wayfinding operations upon arrival of the elevator at the target floor. In another embodiment or in the above embodiment, the method may also comprise generating the elevator call to the elevator upon a detection by a proximity system of a user device within a predetermined distance to the elevator. In another embodiment or in any of the above embodiments, the proximity system may include a plurality of beacons that detects positions of the user device, each of the plurality of beacons are located at different positions with respect to the elevator. In another embodiment or in any of the above embodiments, the at least one of a plurality of wayfinding operations may comprise providing a visual dynamic indicator that directs a user from the elevator to the destination. In another embodiment or in any of the above embodiments, the at least one of a plurality of wayfinding operations may comprise providing information to a user device to cause a presentation of a user interface. In another embodiment or in any of the above embodiments, the user interface may display a travel status. In another embodiment or in any of the above embodiments, the user interface may a prompt to exit the elevator. In another embodiment or in any of the above embodiments, the user interface may directions to the destination from the elevator. In another embodiment or in any of the above embodiments, the user interface may a map that corresponds to the target floor. Another embodiment or any of the above embodiments may be implemented in a system that comprises a processor and a memory, where the processor configured to perform the any of the methods described above.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments relate to an intelligent building system, method, and/or computer program product (herein "intelligent building system") that assists a user with enhanced wayfinding (i.e., indoor navigation) of a destination floor of an elevator trip. In this way, when the user moves within a building interior, the intelligent building system autonomously implements operations and/or sends signals to a device of the user that personally guides that user indoors without manual interaction.

Figure 1:
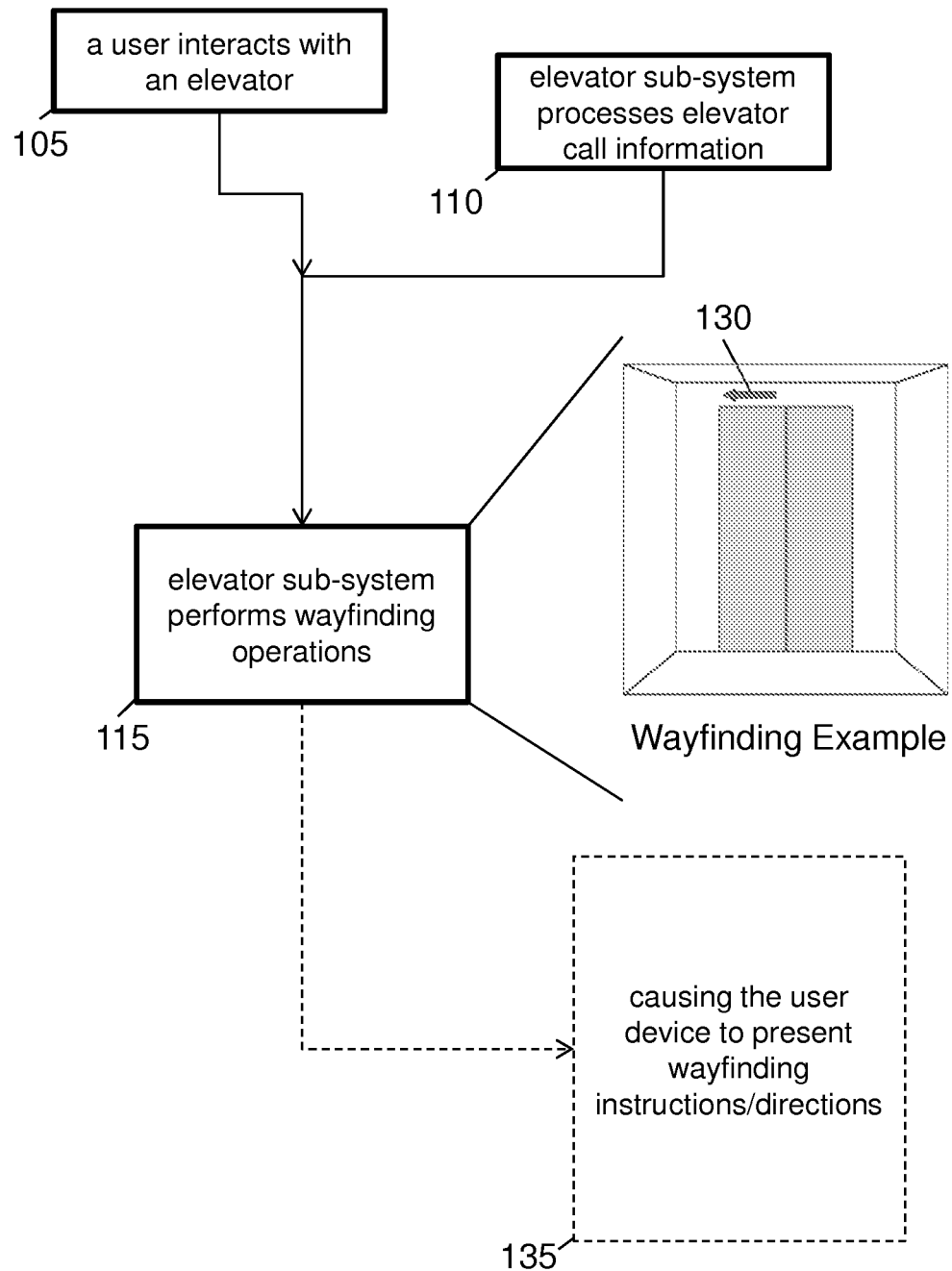
FIG. 1 illustrates a process flow by an intelligent building system according to one embodiment.

An example of enhanced wayfinding by the intelligent building system will be described with reference to FIG. 1. Particularly, FIG. 1 illustrates an example of a process flow 100 by an intelligent building system to detect user actions and/or movements with respect to an elevator bank. Process flow 100 begins at start block 105 where a user interacts with an elevator of the elevator bank by sending an elevator call to an elevator sub-system that controls the elevator. To interact with the elevator, the user can send the elevator call to the elevator sub-system by physically pressing a call button in an elevator lobby and/or sending an elevator call through a user device (e.g., through communication technologies as further described below). As another example, the user device, on behalf of the user, can also automatically communicate the elevator call to the elevator sub-system. Further, the elevator sub-system of the intelligent building system determines a source floor of the user via the elevator call, such as by identifying a floor corresponding to the elevator call button or a location of the user device indicated in the user initiated or automatically communicated elevator call as received by the elevator sub-system. For instance, with respect to the automatically communicated elevator call, an elevator lobby of a particular floor may include a proximity sub-system of the intelligent building system that detects a presence of a user device. In turn, any device detected by that proximity sub-system is determined to have the same source floor as a floor corresponding to the proximity sub-system.

Next, at block 110, the elevator sub-system processes elevator call information. Elevator call information can include a destination. In the case of a physical activation of a floor button on an elevator, the destination corresponds to a target floor associated with that floor button. The destination can further be sourced from user information associated with a user device or stored on the intelligent building system (e.g., in advance). The user device, on behalf of the user, can also automatically communicate elevator call information to the elevator sub-system when the user device is proximate to the elevator bank (e.g., based on the detection of the user device by the proximity sub-system). In this way, the user device can communicate a meeting room, a business suite number, etc., as the destination, which is turn is processed by the elevator sub-system to determine a target floor associated with that destination (e.g., if a destination is suite 401, then the target floor may be the fourth floor). Thus, at the conclusion of blocks 105 and 110, the elevator sub-system knows which floor to load the user (e.g., the source floor due to the elevator call) and which floor to unload the user (e.g., the target floor due to the elevator call information). In turn, the intelligent building system utilizes the source and target floors to assists the user with enhanced wayfinding (i.e., indoor navigation) of those floors before, during, and/or after an elevator trip.

At block 115, the elevator sub-system performs wayfinding operations. In general, wayfinding operations are instructions/directions presented to the user by the intelligent building system via output devices. Embodiments of output devices include visual and/or audio dynamic indicators inside an elevator (e.g., arrow 130 above an elevator door in the Wayfinding Example that indicates a user should proceed to the left after exiting the elevator), inside hallways leading away from an elevator lobby, and/or projectors in the hallways can project on walls and/or the floor to direct the user. For example, if the user device communicates that a doctor's office at suite 401 is a destination to the elevator sub-system, the intelligent building system based on pre-stored maps of the fourth floor would know which instructions/directions to present to the user. In turn, the intelligent building system communicates before, during, and/or after the user's elevator trip to the fourth floor through or using notifications.

Optionally, as indicated by the dashed arrow leading to dashed block 135, the intelligent building system may communicate with the user device to cause the user device to present wayfinding instructions/directions. In this way, the user device is utilized by the intelligent building system as an output device to display in real-time maps, elevator status (e.g., display time to arrival at destination), and/or instructions.

Figure 2:
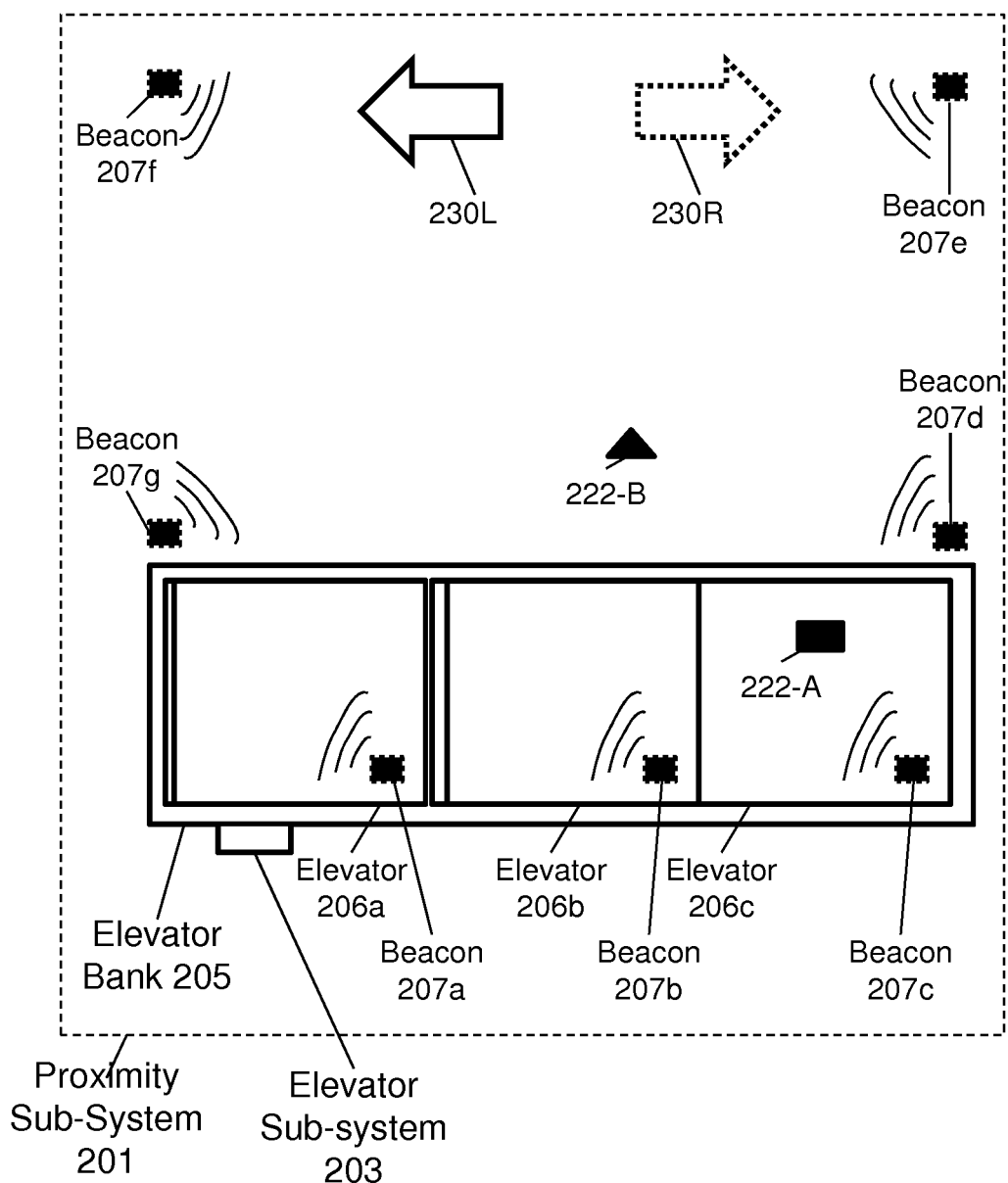
FIG. 2 illustrates an example of a floor schematic of an intelligent building system according to one embodiment.

The intelligent building system will now be described via an example floor schematic of FIG. 2. Note that the example floor schematic is only one example of the intelligent building system and is not intended to suggest any limitation as to the scope of use or operability of embodiments of the invention described herein (indeed additional or alternative components and/or implementations may be used). As illustrated, the example floor schematic generally includes a proximity sub-system 201, an elevator sub-system 203, and an elevator bank 205, which comprises of three elevators 206a, 206b, 206c. The sub-systems (201, 203) of the intelligent building system may be implemented by one or a plurality of computing devices that communicate with any combination of network technologies, as described below, to enable enhanced wayfinding.

The proximity sub-system 201 is device detection system that includes a plurality of beacons 207 that detect the positions of a user device 222. The proximity sub-system 201 illustrates that the plurality of beacons 207 are at multiple different positions with respect to the elevator bank 205 as indicated by the lower case letters a-g. In exemplary embodiments, the beacons 207 use Bluetooth low energy (BLE) technology to detect the presence of and interact with the user device 222. As another alternative, the proximity sub-system 201 may include a geo-fence environment constructed from a plurality of geo-fences, each of which is a virtual perimeter that can be dynamically generated around a geographic location and/or be a predefined set of boundaries, as in a radius around an elevator, elevator lobby, and/or elevator bank or as in property and municipal boundaries. Thus, the proximity sub-system 201 can be generated and perform monitoring by any detection, communication, and/or location technology, such as global positioning systems ("GPS"), radio frequency identification ("RFID"), near field communication ("NFC"), short wave radio, etc.

Further, the proximity sub-system 201 is in communication with the elevator sub-system 203, the user device 222, and/or others elements of the intelligent building system. In this way, the proximity sub-system 201 can provide the user's source floor (e.g., via a predetermined setting that indicates which floor or in what location of a building the proximity sub-system 201 is installed) to the intelligent building system. The proximity sub-system 201 can also be used to communicate and provide wayfinding information to the user device 222 in lieu of or in complement with the elevator sub-system 205 (e.g., regardless of whether the intelligent building system is already utilizing another communication mechanism, such as wireless local area network, to communicate and provide wayfinding information to the user device 222).

The elevator sub-system 203 that comprises electromechanical arrangements (e.g., a controller and/or computing device that communicates with at least one motor) that control speed, position, and door operation of the elevator bank 205. The controller of the elevator sub-system 203 may generate and monitor (or communicate with other systems and sub-systems through any network communication technologies that can generate and monitor) an elevator position, such that the elevator sub-system 203 may operate the elevator bank 205 as a user device interacts with any one of the elevators 206a, 206b, 206c. In some embodiments, the example floor schematic may exclude the proximity sub-system 201 and include the elevator sub-system 203, such that direct communications are made between the elevator sub-system 205 and the user devices 222 in lieu of or in complement with the proximity sub-system 201.

The plurality of beacons 207 are utilized by the proximity sub-system 201 to estimate a location of the user with respect to the elevator bank 205 based on the detection of the user device 222. For instance, each beacon 207a, 207b, 207c detects the user device 222 within a corresponding elevator 206a, 206b, 206c, to determine whether the user is on or off an elevator. The subset of beacons 207d-207g is utilized to triangulate the location of the user device 222 with respect to the elevator bank 205 on that particular floor. For example, a beacon 207c first detects the user device 222 at position A and then the subset of beacons 207d-207g subsequently detects the user device 222 at position B. In this way, the proximity 201 sub-system determines that a user has ridden the elevator 206c to the floor corresponding to the subset of beacons 207d-207g and exited the elevator 206c on that floor.

The user device 222 may be implemented using devices having short and/or long range communication and location services (e.g., mobile phone with GPS enabled). The user may be individually identified based on one or more identifiers stored in the user device 222. The user device 222 can provide information, such as a destination, a preferred floor, a target floor, a device position, device movements, a source floor, and/or other preferences and data, which may also be received and stored in the elevator sub-system 203. In this way, this information is utilized by the intelligent building system to enhance and improve indoor wayfinding. Note that the roles of the elevator sub-system 203 and the user device 222 may include the user device 222 detecting and processing broadcasted signals by any of the beacons 207. In turn, the user devices 222 can issue commands to the elevator sub-system 203 (e.g., commands that originates from the user device 222).

The arrows 230L, 230R are examples of visual dynamic indicators inside an elevator lobby of the elevator bank 205 that are projected on the floor to direct the user. For example, if the doctor's office at suite 401 is to the users left as they exit the elevator bank 205, the arrow 230L can be projected on the floor to assist the user in finding their way to the doctor's office. Note that arrow 230R is illustrated with a dotted line due to the user not needing this particular output device in this example.

Figure 3:
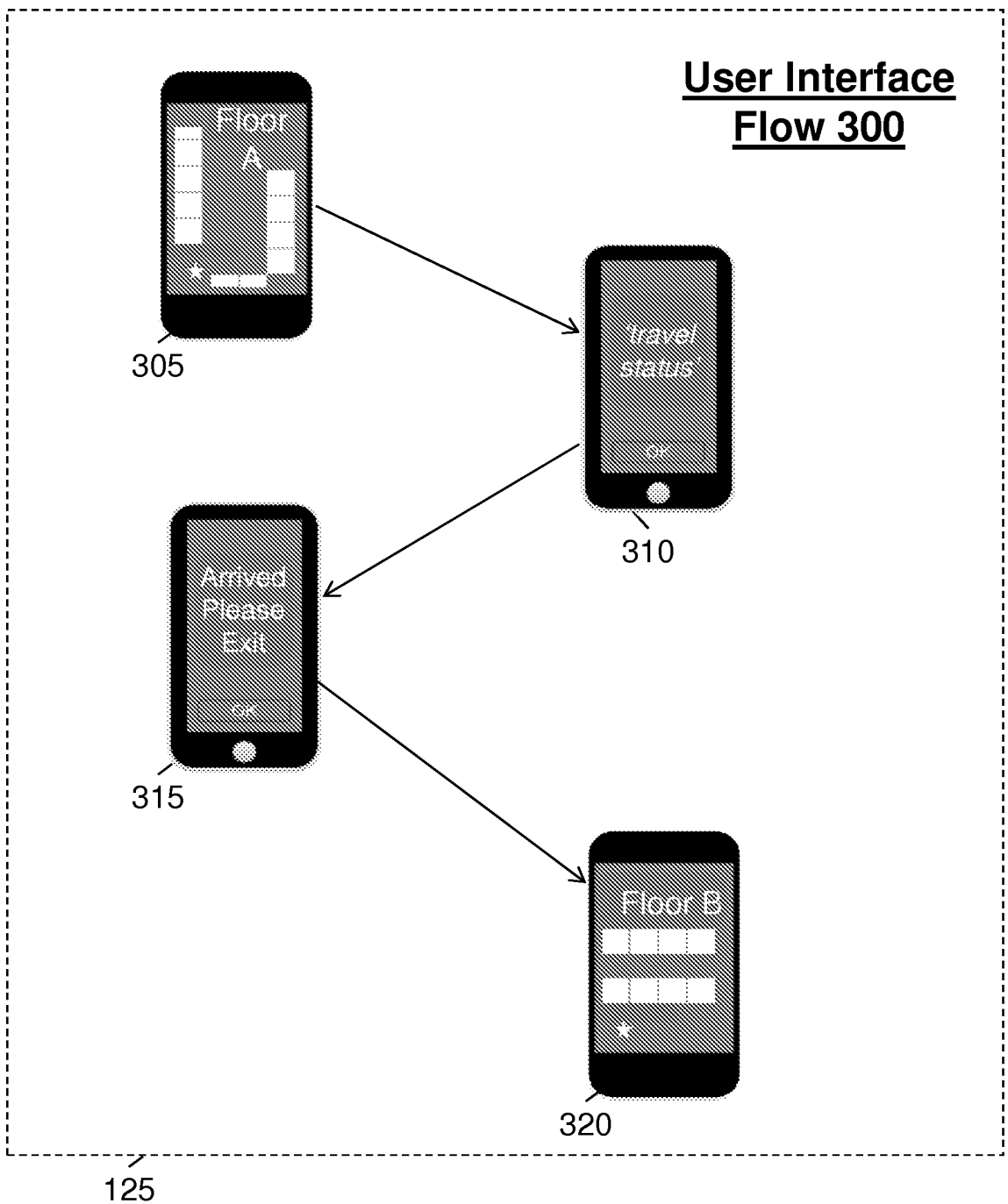
FIG. 3 illustrates a user interface flow by an intelligent building system according to one embodiment.

In view of the above, an example of a set of user interfaces displayed by the user device 222 to present wayfinding instructions/directions, as described with respect to dashed block 135, will be described with reference to FIG. 3. FIG. 3 illustrates a user interface flow 300 of user interfaces that assist a user with wayfinding. The user interface flow 300 begins with user interface 305, which presents a map of Floor A on the user device 222 (e.g. a smartphone) based on information received from the intelligent building system that the user device 222 is on Floor A. The star of the user interface 305 indicates a device position within the map of Floor A, while the white blocks may indicate partitions. The device position is identified by a proximity sub-system of Floor A that scans the entirety of Floor A and supplies that device position to the user device 222 for presentation. Further, the map of Floor A may be a zoomed in view of a hallway that leads to an elevator lobby of Floor A.

Once the user traverses the hallway and enters the elevator lobby, an elevator call may be automatically initiated based on a communication between the user device 222 and the proximity sub-system of Floor A. That is, once the user device is within a predetermined distance of the elevator bank 205, the proximity sub-system of Floor A initiates the elevator call. The elevator call contains a destination that is sent, along with a source floor of the proximity system of Floor A, to the elevator sub-system 203. In this way, the user does not fumble with the user device 222 when approaching the elevator bank 205 and the elevator sub-system 203 automatically dispatches the elevator 206 to pick up the user at the source floor.

Next, as the user rides the elevator to the destination floor, a 'travel status' is presented by the user device 222, as illustrated in user interface 310. The 'travel status' includes information that enhances a user's wayfinding experience, such as time to a target floor associated with the destination, distance to the target floor, directions to the destination upon arrival to the target floor, etc. The 'travel status' can be derived by the intelligent building system and forwarded to the user device 222 and/or derived by the user device 222 from raw elevator positional information transmitted from the intelligent building system. Upon arrival, the user device 222 presents a user interface 315 that instructs the user to exit the elevator based on information received from the intelligent building system that the user device 222 has arrived at a target floor (e.g., Floor B).

The proximity sub-system 201, which is different from the proximity sub-system of Floor A, determines based on the detection of the user device 222 by the subset of beacons 207d-207g that the user has exited the elevator 206c. In turn, the proximity sub-system 201 notifies the user device 222 of the floor change to cause the user device to seamlessly update to a map of Floor B, as shown in user interface 320. In addition, one of the arrows 230L, 230R can be projected on the floor to assist the user in finding to their destination on Floor B. Note that while the proximity system 301 (e.g., the geo-fence environment) can notify the user device 222 of floor changes, as the proximity system 301 is configured to know which floor it is located on, in other embodiments the elevator sub-system 105 notifies the user device of the floor changes directly, since elevator position is very accurately maintained by the elevator sub-system 203.

Note that at any time, before, during, and/or after the elevator trip, the user interfaces of the user device 222 may present a variety of information. For example, the user interfaces may present directions, such as left, right, straight, U-turn, and combination thereof; distance to destination; distance between each portion of a path to the destination. In another embodiment, the user device 222 may be configured to execute a disability mode that provides audio outputs in lieu of or in conjunction with visual outputs to assist a user who is fully or partially blind (e.g., where the visual outputs are alternate or enlarged font user interfaces).

Figure 4:
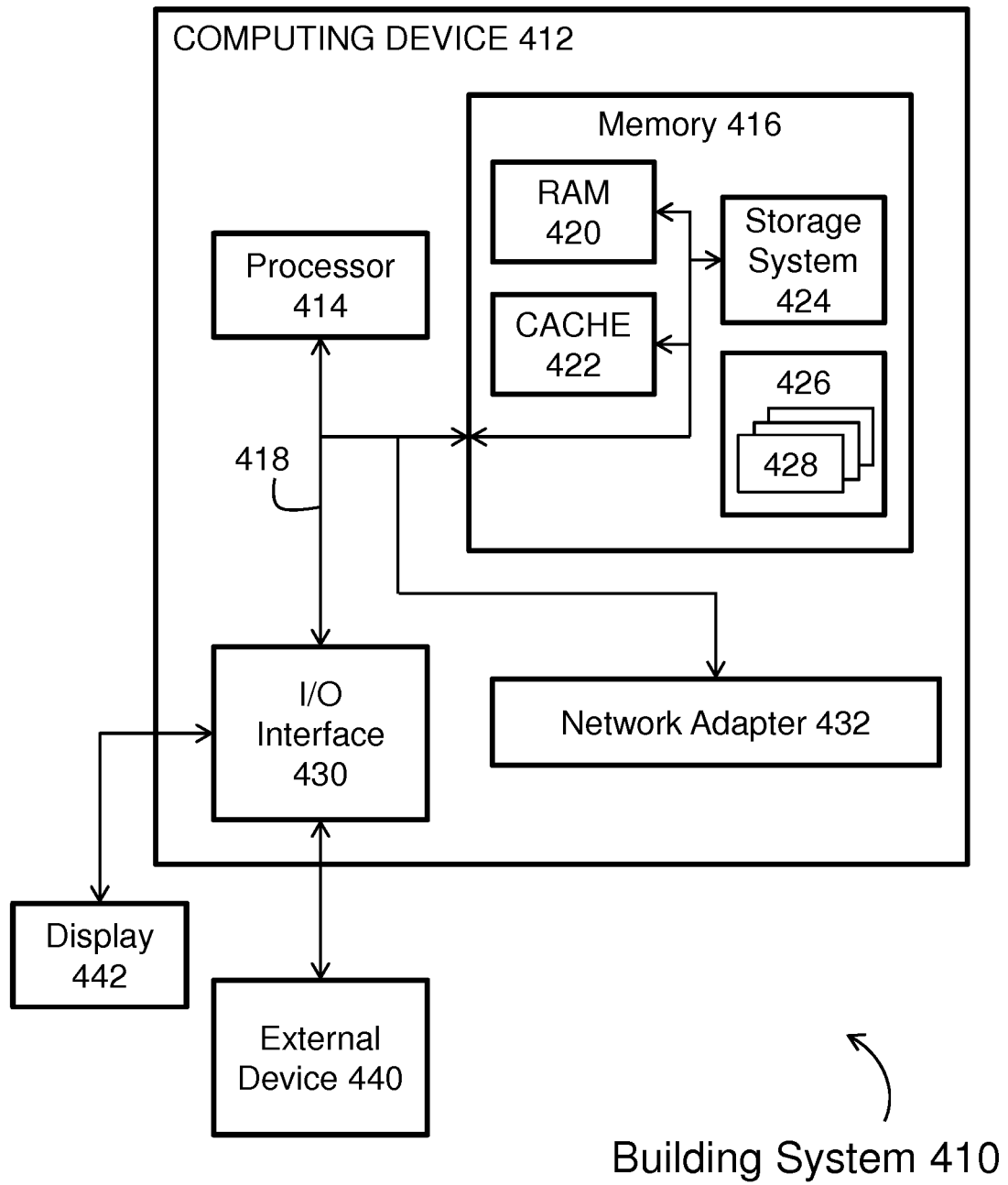
FIG. 4 illustrates a computing device schematic of an intelligent building system according to one embodiment.

Referring now to FIG. 4, an example schematic of a computing node schematic of an intelligent building system 410 is shown. The intelligent building system 410 is only one example of a suitable computing node and is not intended to suggest any limitation as to the scope of use or operability of embodiments of the invention described herein (indeed additional or alternative components and/or implementations may be used). That is, the intelligent building system 410 and elements therein may take many different forms and include multiple and/or alternate components and facilities. Further, the intelligent building system 410 may include and/or employ any number and combination of computing devices and networks utilizing various communication technologies, as described herein. Regardless, the intelligent building system 410 is capable of being implemented and/or performing any of the operability set forth hereinabove.

In the intelligent building system 410 there is at least one computing device 412, which is operational with numerous other general purpose or special purpose computing system environments or configurations. The at least one computing device 412 may include and/or implement the operation of the sub-systems 201, 203 of the intelligent building system to enable enhanced wayfinding. Systems and/or computing devices, such as the intelligent building system 410 and/or the computing device 412, may employ any of a number of computer operating systems. Examples of computing systems, environments, and/or configurations that may be suitable for use with the computing device 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 412 may be described in the general context of computer system executable instructions, such as program modules, being executed by a computer system. Generally, program modules may include routines, programs, objects, components, logic, data structures, and so on that perform particular tasks or implement particular abstract data types. The computing device 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computing device 412 in the intelligent building system 410 is shown in the form of a general-purpose computing device that is improved upon based on the operation and functionality of the intelligent building system 412, its methods, and/or elements thereof. The components of the computing device 412 may include, but are not limited to, one or more processors or processing units 414, a memory 416, and a bus 418 that couples various system components including to the processor 414 and the system memory 416. The computing device 412 also typically includes a variety of computer system readable media. Such media may be any available media that is accessible by the computing device 412, and it includes both volatile and non-volatile media, removable and non-removable media.

The processor 414 may receive computer readable program instructions from the memory 416 and execute these instructions, thereby performing one or more processes defined by the intelligent building system 410. The processor 414 may include any processing hardware, software, or combination of hardware and software utilized by the computing device 414 that carries out the computer readable program instructions by performing arithmetical, logical, and/or input/output operations. Examples of the processor 414 include, but are not limited to an arithmetic logic unit, which performs arithmetic and logical operations; a control unit, which extracts, decodes, and executes instructions from a memory; and an array unit, which utilizes multiple parallel computing elements.

The memory 416 may include a tangible device that retains and stores computer readable program instructions, as provided by the intelligent building system 410, for use by the processor 414 of the computing device 412. The memory 416 can include computer system readable media in the form of volatile memory, such as random access memory 420, cache memory 422, and/or the storage system 424.

By way of example only, the storage system 424 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As will be further depicted and described below, the memory 416 may include at least one program product having a set (e.g., at least one) of program modules that are configured to carry out the operations of embodiments of the invention. The storage system 424 (and/or memory 416) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 424 may generally be included within the computing device 412, as illustrated, employing a computer operating system such as one of those mentioned above, and are accessed via a network in any one or more of a variety of manners.

Program/utility 426, having a set (at least one) of program modules 428, may be stored in memory 416 by way of example, and not limitation, as well as an operating system, one or more application programs, other program modules, and program data. Each of the operating system, one or more application programs, other program modules, and program data or some combination thereof, may include an implementation of a networking environment. Program modules 428 generally carry out the operations and/or methodologies of embodiments of the invention as described herein.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing device 412 may also communicate via an input/output (I/O) interface 430 and/or via a network adapter 432. The I/O interface 430 and/or the network adapter 432 may include a physical and/or virtual mechanism utilized by the computing device 412 to communicate between elements internal and/or external to the computing device 412. For example, the I/O interface 430 may communicate with one or more external devices 440, such as a keyboard, a pointing device, a display 440, etc.; one or more devices that enable a user to interact with the computing device 412; and/or any devices (e.g., network card, modem, etc.) that enable the computing device 412 to communicate with one or more other computing devices. Further, the computing device 412 can communicate with one or more networks such as a local area network (LAN), a general wide area network (WAN), and/or a public network (e.g., the Internet) via network adapter 432. Thus, I/O interface 430 and/or the network adapter 432 may be configured to receive or send signals or data within or for the computing device 412. As depicted, the I/O interfaces 430 and the network adapter 432 communicates with the other components of the computing device 412 via the bus 418. It should be understood that although not shown, other hardware and/or software components could be used in conjunction with the computing device 412. Examples, include, but are not limited to: microcode, device drivers, redundant processing units, external disk drive arrays, RAID systems, tape drives, and data archival storage systems, etc.

While single items are illustrated for the intelligent building system 410 (and other items) by FIG. 4, these representations are not intended to be limiting and thus, any items may represent a plurality of items. In general, computing devices may include a processor (e.g., a processor 414 of FIG. 4) and a computer readable storage medium (e.g., a memory 416 of FIG. 4), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the intelligent building system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of building system and method. The intelligent building system, as implemented and/or claimed, improves the functioning of a computer and/or processor itself by enabling a seamless user experience between elevator sub-systems and user devices through transmission and translation of elevator position information that are further utilized to deliver faster and more convenient wayfinding. Further, the functioning is improved by properly orienting user indoors through personalization, while maintaining user privacy and without manual interaction.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   generating, by a processor, an elevator call to an elevator upon a detection by a proximity system of a user device within a predetermined distance to the elevator;
   generating, by the processor, a map on the user device in response to detection of the user device, the map corresponding to a source floor;
   receiving, by a processor, the elevator call that indicates a source floor and a destination;
   processing, by the processor, the destination to derive a target floor;
   causing, by the processor, an elevator to travel between the source floor and the target floor; and
   performing, by the processor, at least one of a plurality of wayfinding operations upon arrival of the elevator at the target floor, wherein the at least one of the plurality of wayfinding operations upon arrival of the elevator at the target floor includes updating the map to correspond to the target floor.

2. The method of claim 1, wherein the proximity system includes a plurality of beacons that detects positions of the user device, each of the plurality of beacons are located at different positions with respect to the elevator.

3. The method of claim 1, wherein the at least one of a plurality of wayfinding operations comprises:
   providing a visual dynamic indicator that directs a user from the elevator to the destination.

4. The method of claim 1, wherein the at least one of a plurality of wayfinding operations comprises:
   providing information to a user device to cause a presentation of a user interface.

5. The method of claim 1, wherein the user interface displays a travel status.

6. The method of claim 1, wherein the user interface displays a prompt to exit the elevator.

7. The method of claim 1, wherein the user interface displays directions to the destination from the elevator.

8. A system, comprising a processor and a memory, the processor configured to perform:
   generate an elevator call to an elevator upon a detection by a proximity system of a user device within a predetermined distance to the elevator;
   generate a map on the user device in response to detection of the user device, the map corresponding to a source floor;
   receive an elevator call that indicates a source floor and a destination;
   process the destination to derive a target floor;
   cause an elevator to travel between the source floor and the target floor; and
   perform at least one of a plurality of wayfinding operations upon arrival of the elevator at the target floor, wherein the at least one of the plurality of wayfinding operations upon arrival of the elevator at the target floor includes updating the map to correspond to the target floor.

9. The system of claim 8, wherein the proximity system includes a plurality of beacons that detects positions of the user device, each of the plurality of beacons are located at different positions with respect to the elevator.

10. The system of claim 8, wherein the at least one of a plurality of wayfinding operations comprises:
    providing a visual dynamic indicator that directs a user from the elevator to the destination.

11. The system of claim 8, wherein the at least one of a plurality of wayfinding operations comprises:
    providing information to a user device to cause a presentation of a user interface.

* * * * *